United States Patent [19]

Lehmann

[11] 4,350,471
[45] Sep. 21, 1982

[54] ROOF RACK IN PARTICULAR FOR CROSS COUNTRY VEHICLES, AMBULANCES AND THE LIKE

[75] Inventor: J. C. Ludwig Lehmann, Lorch, Fed. Rep. of Germany

[73] Assignee: Binz GmbH & Co., Lorch, Fed. Rep. of Germany

[21] Appl. No.: 194,288

[22] Filed: Oct. 6, 1980

[30] Foreign Application Priority Data

Oct. 16, 1979 [DE] Fed. Rep. of Germany ... 7929282[U]

[51] Int. Cl.³ .............................................. B62D 43/02
[52] U.S. Cl. ................................. 414/463; 224/42.12; 224/42.21; 224/310; 224/329
[58] Field of Search ................ 224/310, 319, 329–331, 224/42.12, 42.13, 42.14, 42.21, 42.23; 414/462, 463, 465, 466

[56] References Cited

U.S. PATENT DOCUMENTS

| | | | |
|---|---|---|---|
| 2,052,970 | 9/1936 | Erbeck | 414/466 |
| 2,715,974 | 8/1955 | Van Nest | 414/462 |
| 3,381,866 | 5/1968 | Wickett | 224/42.13 |
| 3,481,518 | 12/1969 | Anetsberger | 224/310 |
| 3,756,648 | 9/1973 | Greif | 414/462 X |
| 3,809,425 | 5/1974 | Blaschke | 224/310 X |
| 3,963,136 | 6/1976 | Spanke | 224/310 X |
| 4,240,571 | 12/1980 | Ernst | 224/310 |
| 4,291,823 | 9/1981 | Freeman et al. | 224/310 |

Primary Examiner—William Price
Assistant Examiner—Gary E. Elkins
Attorney, Agent, or Firm—Michael J. Striker

[57] ABSTRACT

The roof rack 1 consists of a load carrying part 13 which is movable between a transport position above the roof 5 of a vehicle and a loading position at one side of, or at the rear of, the vehicle. The load carrying part 13 is pivotally mounted 14 to a carriage 9 which is adapted to slide in guides 7, 7' of a support frame 6, 3, 7, 7' which is fixed to the rain channel 4 of the vehicle roof. The movement of the load carrying part between the transport and loading positions is thus a combination of pivotal movement at the hinges 14 and displacement of the carriage 9 in the guides 7, 7'. Further guide members 17 which curve around the edge of the vehicle roof are usefully provided to help control the movement of the load carrying part.

5 Claims, 5 Drawing Figures

ROOF RACK IN PARTICULAR FOR CROSS COUNTRY VEHICLES, AMBULANCES AND THE LIKE

FIELD OF THE INVENTION

The invention relates to a roof rack of the kind having a support frame which can be fastened to the roof of a vehicle and has particular reference to a roof rack for cross country vehicles, ambulances and the like.

BACKGROUND TO THE INVENTION

Roof racks for vehicles with a high roof line are not easy to reach and are thus difficult to load. This is particularly true of cross country ambulances or other vehicles in which the shape, and in particular the height of the body work, is primarily determined by the purpose of the vehicle with less emphasis on a pleasing appearance.

PRINCIPAL OBJECT OF THE INVENTION

The principal object underlying the present invention is accordingly to provide a roof rack which is easy to load and unload even when used on vehicles with a high roof line.

BRIEF DESCRIPTION OF THE INVENTION

To satisfy the above principal object the present invention proposes a roof rack comprising a support frame, capable of being mounted on a roof of a vehicle, and a load carrying part supported by said support frame and adapted to be pivoted downwardly at one side of the support frame from a transport position into a loading position.

The arrangement is usefully such that the load carrying part can be pivoted downwardly to a hanging position alongside one of the sides of the vehicle. Alternatively the load carrying part can be pivoted downwardly to a hanging position at the rear of the vehicle. The invention allows the loading height, at which the load has to be placed on the roof rack, to be reduced considerably so that even vehicles which are taller than a man can be loaded without difficulties. The accessibility of the load is in any case significantly improved.

The roof rack of the invention is preferably used to carry a spare wheel. Accordingly a wheel mount for accommodating a spare wheel is arranged on the load carrying part. A spare wheel mounting of this kind is particularly suitable for cross country vehicles and ambulances and can be anchored by means of simple clamping devices to the rain channel on the roof of the vehicle without the need to make other changes to the vehicle. The accommodation of the spare wheel on the roof is particularly useful for ambulances because the spare wheel cannot be housed inside the vehicle for reasons of hygiene and external mounting of the wheel at the rear of the vehicle means that the normally provided large rear door is undesirably loaded so that reinforcement of the hinges becomes necessary.

It would be possible to mount a spare wheel on the side of the vehicle. This is, however, undesirable because it poses a potential danger to other road users.

It would of course also be possible to mount the spare wheel beneath the vehicle floor. This is, however, generally not possible because the ground clearance would be reduced which is particularly unacceptable for a cross country vehicle. Furthermore an underfloor mounting is often difficult of access.

Preferably the load carrying part is so arranged that it can be pivoted downwardly and simultaneously displaced in a longitudinal or transverse direction of the support frame. The movement of the load carrying part from the transport position to the loading position is preferably opposed by return springs so that, after loading, the load carrying part can be more easily returned to the transport position.

Load support members can be provided on the load carrying part so as to support the load when the load carrying part is in the loading position. The support members are conveniently arranged at a, then, lower edge of the load carrying part.

The load carrying part can be displaceably guided in transverse or longitudinal guide members of the support frame and pivotally supported about a pivot axis extending transversely to the direction of displacement. The transverse or longitudinal guide members can simultaneously serve as transverse or longitudinal side rails of the support frame.

The pivot axis for the load carrying part is conveniently arranged to one side of the center of gravity of the load carrying part with the load carrying part resting, on the center of gravity side of the pivot, on at least one further guide member which is fixed relative to the support frame and which extends at least partially around the edge of the vehicle roof in the direction of displacement of the load carrying part. In this way the load carrying part is additionally supported so that displacement of the load carrying part is accompanied by controlled pivotal movement about said pivot axis.

The further guide member, or guide members, can be constructed as a simple slide on which the load carrying part rests. In an arrangement of this kind it is useful if the slide and/or the region of the load carrying part which rests thereon is/are provided with a friction reducing surface; for example of synthetic material or the like.

In order to support the load carrying part in the transverse or longitudinal guides a displaceable carriage can conveniently be arranged in the guides with the load carrying part being pivotally attached to the carriage transversely to the direction of displacement. The load carrying part is preferably pivotally connected to one side of this carriage.

The use of a carriage means that tilting of the load carrying part relative to the guides is avoided so that it is always easy to move the load carrying part.

The transverse or longitudinal guides are usefully formed as U-shaped sections each having a U-shaped groove in which guide elements arranged on the load carrying part or carriage can engage. The guide elements are preferably in the form of guide rollers.

A specially preferred embodiment of the invention in the form of a roof rack for carrying a spare wheel will now be described, by way of example only, with reference to the accompanying drawings.

BRIEF DESCRIPTION OF THE DRAWINGS

In the drawings there is shown

DESCRIPTION OF THE PREFERRED EMBODIMENT

Figure 1:
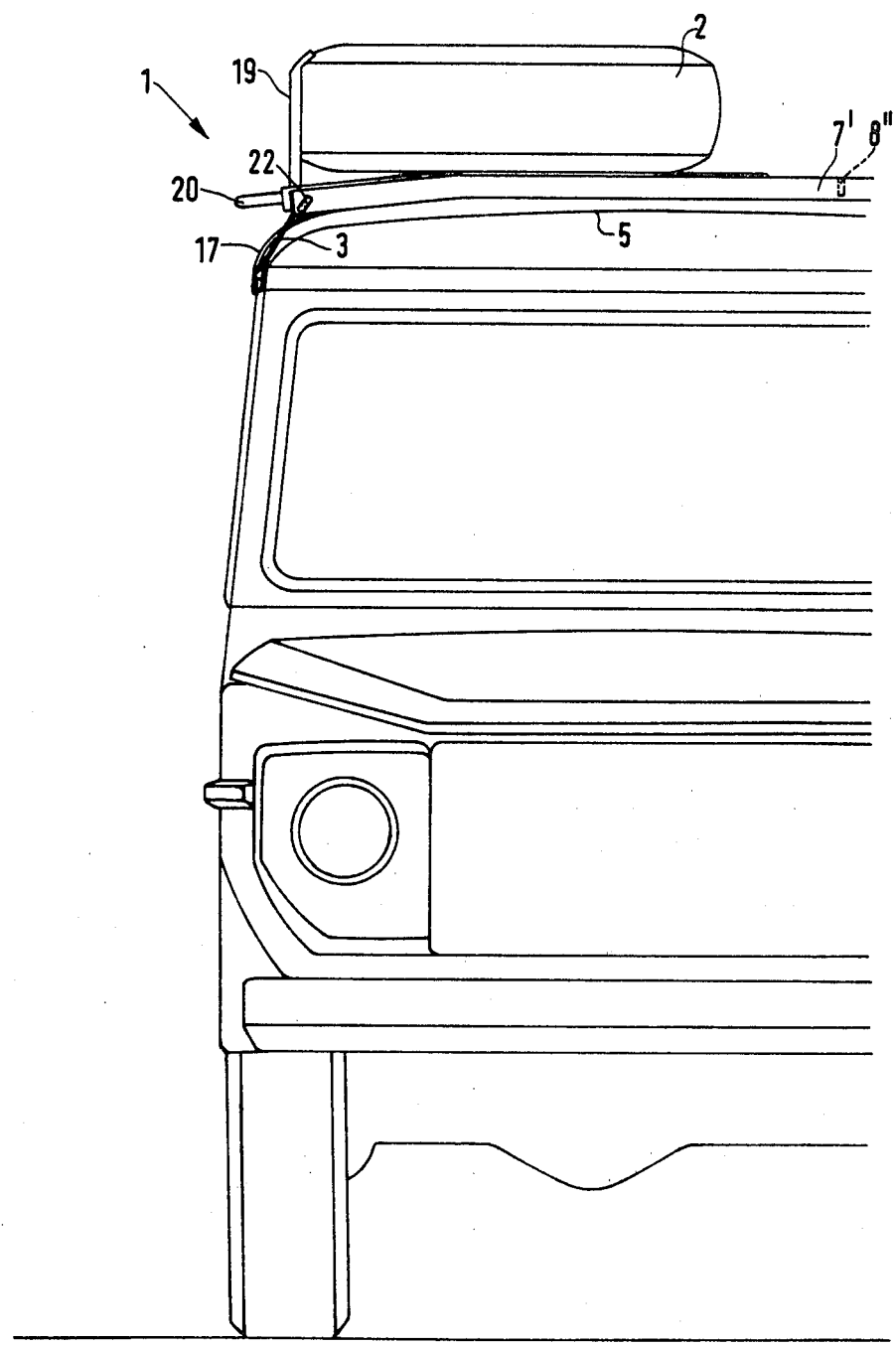
FIG. 1 a front view of a cross country vehicle equipped with a roof rack with the load carrying part located in a transport position, FIG. 2 a corresponding front view but showing the load carrying part in a loading position, FIG. 3 a side view of the roof rack in the direction of the arrow III of FIG. 2, FIG. 4 a sectional view of the roof rack along the section line IV—IV of FIG. 3 and FIG. 5 a sectional view of the roof rack along the section line V—V of FIG. 4.

A roof rack designated by the reference numeral 1 is used to support a spare wheel 2 and is fastened in known manner via supports 3 to the rain channel 4 of the roof 5 of a vehicle. For this purpose the supports 3 are inserted in the rain channel 4 and are secured by means of angled brackets 6. Each angled bracket has one limb which is bolted to a support 3 and another limb which engages beneath the rain channel 4. In this way the supports 3 are anchored in form-locked manner to the rain channel 4.

The roof rack 1 has two transverse side rails which act as transverse guides 7, 7' and which are arranged spaced apart across the vehicle roof transverse to the longitudinal direction of the vehicle. The side rails define a support frame and can be connected together by longitudinally and/or diagonally extending struts (not shown) in order to increase the torsional stiffness of the support frame and to clearly define the separation between the two side rails. The transverse guides 7, 7' are constructed as U-shaped sections each of which has a U-shaped groove 8.

A carriage 9 is displaceably guided in the grooves 8. The carriage 9 consists of longitudinal box sections 10, 10' and transverse box sections 11, 11' (referred to the longitudinal direction of the vehicle) with guide rollers 12, 12' arranged on the transverse box sections 11, 11'. The guide rollers 12, 12' engage in the grooves 8 of the transverse guide 7, 7'.

The U-shaped grooves 8 are provided with stops 8' (see FIG. 3) at their ends and the guide rollers 12 can only move up to the stops so that the carriage 9 is not able to fall out of the guides 7, 7'. Further stops 8" limit the inward movement of the carriage.

A load carrying part 13 is pivotally mounted at one side of the carriage 9, by means of hinges 14, to the transverse box sections 11, 11' and is thus able to pivot about a pivot axis which extends parallel to the longitudinal axis of the vehicle. The load carrying part 13 consists of two carrier members 15, 15' which, together with the cross struts 16, form a rectangular frame.

The load carrying part 13 contacts further guide members 17 to one side of the pivot axis defined by the hinges 14. The load carrying part 13 is able to slide relative to these further guide members which extend in a curve around the edge of the vehicle roof 5 and are fastened to the guides 7, 7' and/or the support members 3. These further guide members 17 can be coated with a friction reducing synthetic material. The components of the load carrying part which rest on the further guide members 17, i.e. in the illustrated embodiment the box section carrier members 15, 15' can also be coated in similar fashion at their contact surfaces.

Figure 2:
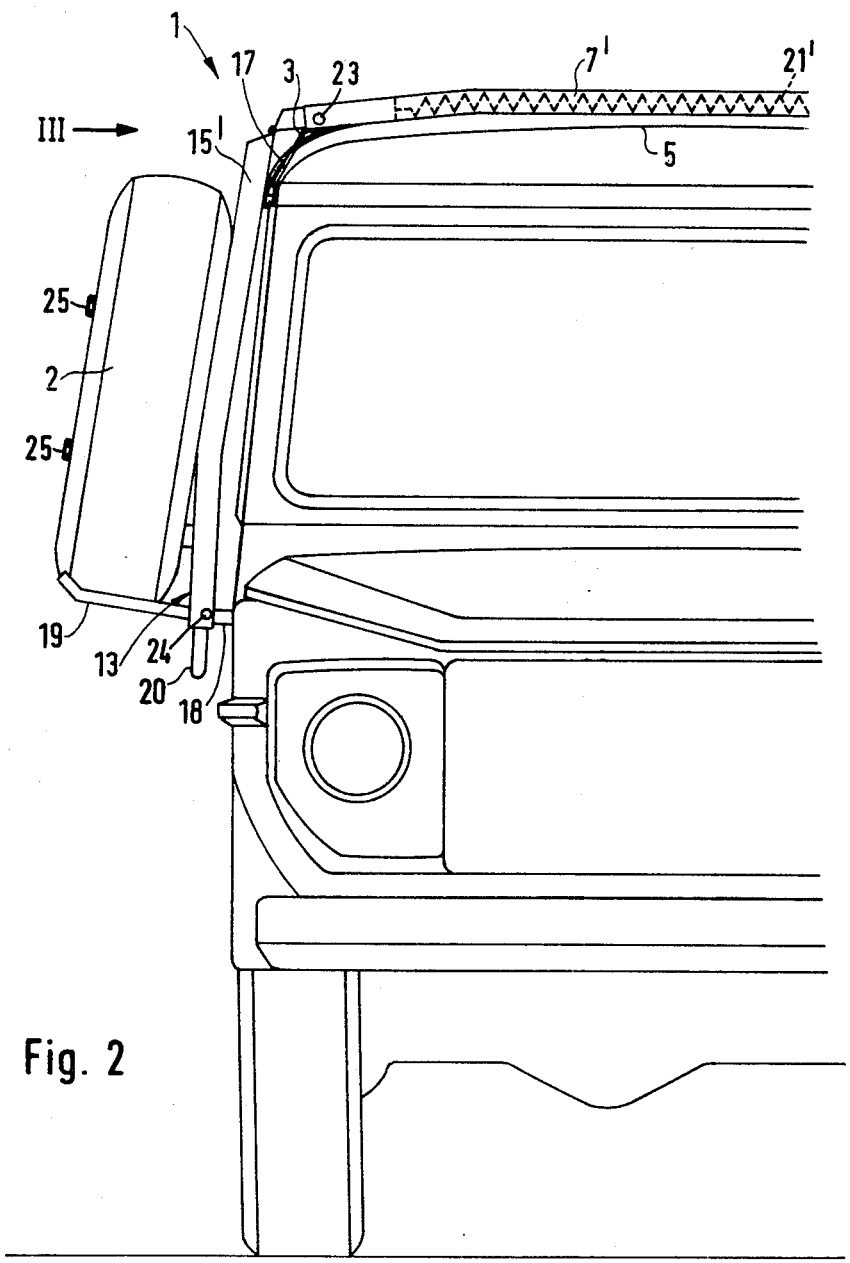
Figure 3:
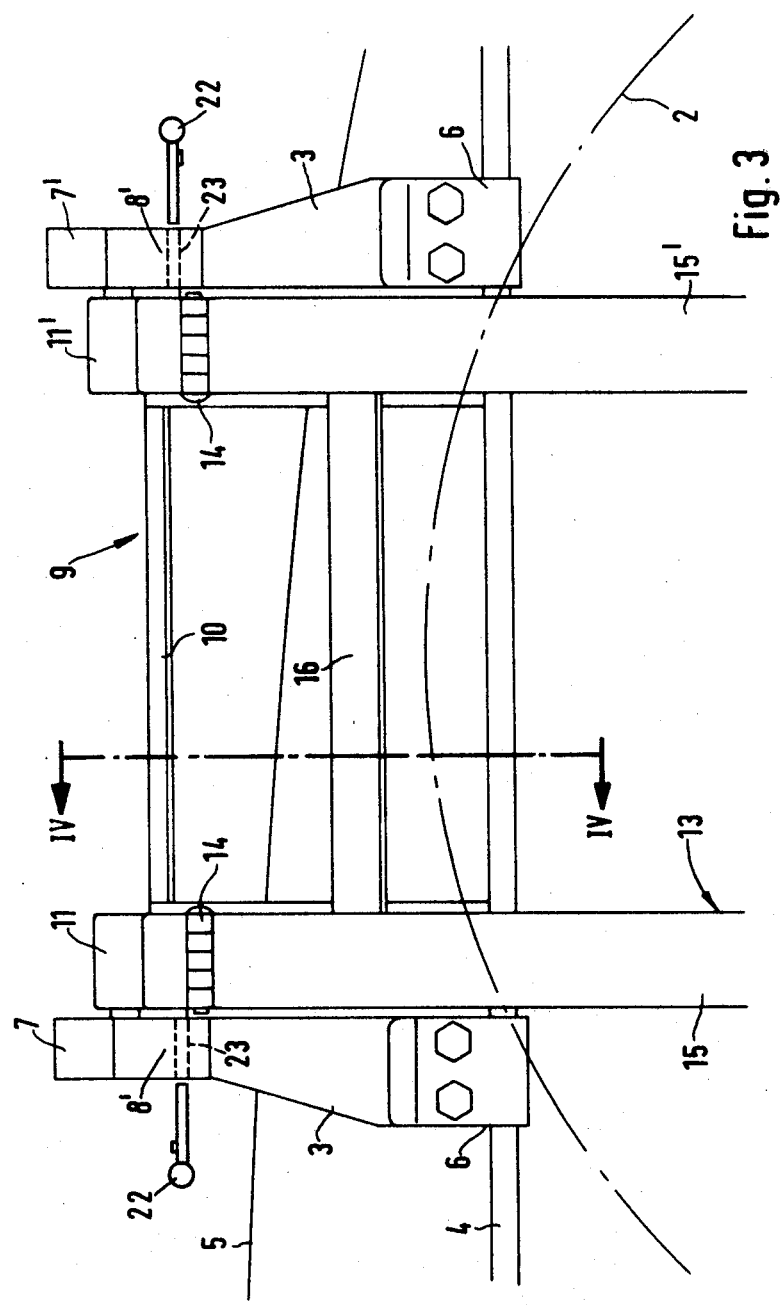
Figure 4:
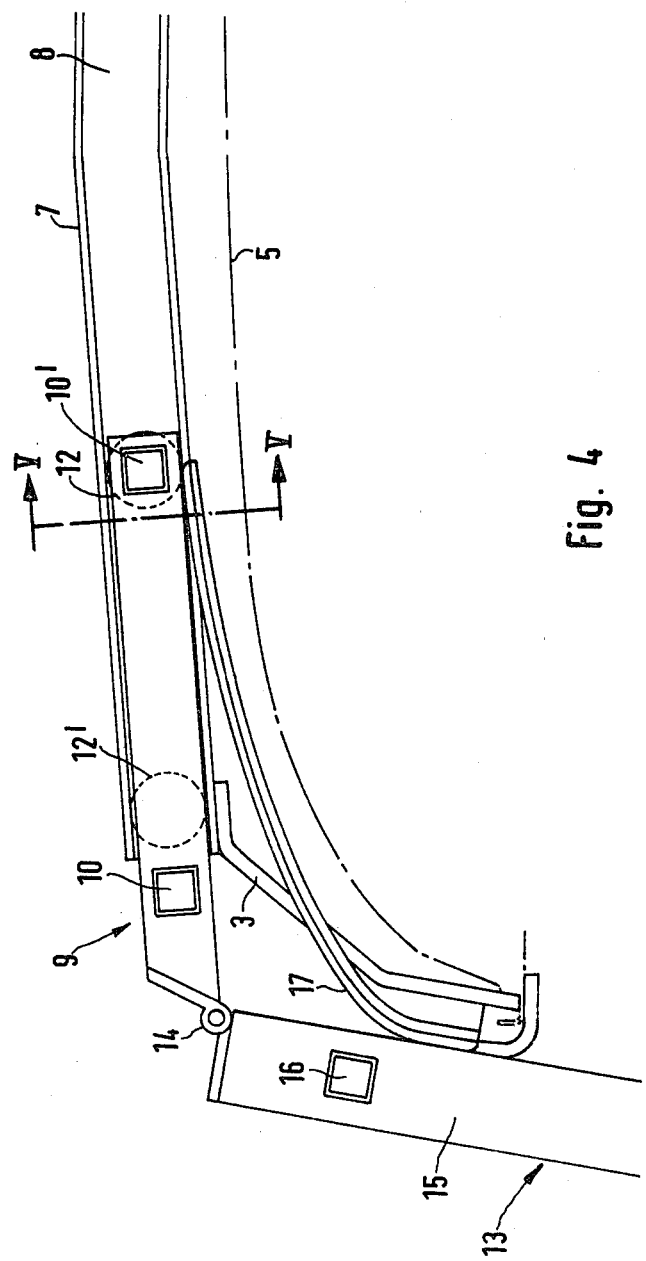
Figure 5:
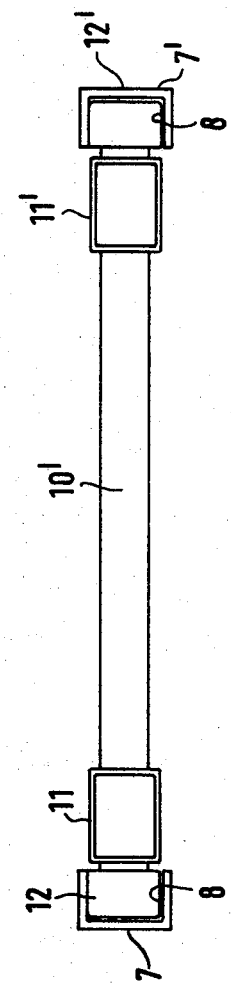

The load carrying part 13 can be brought from a loading position as illustrated in FIGS. 2 to 4, in which the load carrying part is pivoted downwardly against the side wall of the vehicle, into a transport position as illustrated in FIG. 1. To achieve this the load carrying part 13 is lifted gently and, accompanied by simultaneous sideways movement of the carriage 9, is pushed on the further guide members 17 over the vehicle roof 5.

In order to be able to slide the load carrying part 13 more easily over the vehicle roof 5 return springs 21 (see FIG. 2) can be provided between the carriage 9 and the support frame of the roof rack 1. It will be appreciated that the springs should be either tensioned or compressed when the load carrying part is in the loading position so that, when it is desired to return the load carrying part to the transport position, the springs are able to push or pull the carriage 9 to the right as seen in FIG. 4.

In the loading position the load carrying part 13 contacts the further guide members 17 and also hangs from the carriage 9 via the pivots 14. In this position the load carrying part 13 tries to draw the carriage 9 sideways out of the guides 7, 7' so that the front guide rollers 12' abut against the stops provided at the ends of the guides 7, 7'. As a result the load carrying part 13 adopts a stable position.

In order to prevent spring movement of the load carrying part 13, as a result of the elasticity of the support members 3 when subjected to greater loads, a cushion 18 can be arranged at the lower end of the load carrying part 13 (referred to the transport position). The cushion 18, which can for example be of rubber or the like, serves to brace the load carrying part 13 in the loading position against the side wall of the vehicle.

In order to simplify loading, load support members 19 are provided at the lower edge of the load carrying part 13 (as seen in the loading position). These load support members 19 serve to support the load, in the illustrated case the spare wheel 2, when the load or spare wheel is released from the load carrying part, or is initially placed on the load carrying part. The ends of the, preferably rod or tube-like, load support members 19 can, if required, carry the cushions 18. Screws 25 serve to fasten the spare wheel 2 to the carrier members 15, 15'.

A grip 20 can also be arranged at the lower edge of the load carrying part 13 (again as seen in the loading position) which, in the transport position of the load carrying part 13, then projects somewhat beyond the edge of the vehicle roof so that the user is readily able to hold the load carrying part 13 during displacement and pivoting of the same between the transport and loading positions and vice versa.

In the transport position the load carrying part is supported above the roof 5 and, on the one hand, rests on the curved guide members 17 and, on the other hand, is supported via the hinges 14 from the carriage 9.

A latching device, for example a latching pin 22 which cooperates with holes 23, 24 in the guides 7, 7' and the load carrying part 13 respectively, serves to lock the carriage 9 and/or the load carrying part 13 to parts of the support frame, for example the guides 7, 7' of the roof rack 1.

It will be appreciated by those skilled in the art that other modifications can be made to the described arrangement without departing from the scope of the present teaching. It will be particularly appreciated that the load carrying part can be readily equipped with special mounts for carrying a variety of pieces of equipment other than a spare wheel. The mounting of a spare wheel on the load carrying part can conveniently take place in accordance with any one of the wellknown arrangements for mounting a spare wheel.

I claim:

1. A roof rack for vehicles, comprising guide members capable of being rigidly mounted on a roof of a vehicle; a load carrying part supported and guided by said guide members; said load carrying part being displaceable on said guide members and pivotable about a substantially horizontal pivot extended transversely of said guide members to move from a substantially horizontal transport position on the roof of the vehicle into substantially vertical loading position at one side of the vehicle; a carriage adapted for limited displacement in said guide members, said pivot lying on one side of said load carrying part relative to the center of gravity of said load carrying part and having a pivot axis extending transversaly of direction of said displacement; and at least one additional guide member rigidly connected to the vehicle and extended around the edge of said vehicle to support said one side of said load carrying part when the latter is displaced between said transport position and said loading position so that the load carrying part is moved from said transport position to said loading position without contacting the vehicle roof.

2. The roof rack of claim 1, further including guide rollers disposed between said carriage and said guide members.

3. The roof rack of claim 2, wherein said guide rollers are mounted on said carriage.

4. The roof rack of claim 3, further including stops on said guide members for limiting the displacement of said carriage in said guide members.

5. The roof rack of claim 4, wherein said additional guide member is coated with a friction reducing synthetic material.

* * * * *